United States Patent Office 3,445,444
Patented May 20, 1969

3,445,444
PROCESS FOR PURIFYING POLYOLEFINS
Abraham Kutner, Wilmington, Del., assignor to Hercules Incorporated, Wilmington, Del., a corporation of Delaware
No Drawing. Filed Jan. 18, 1966, Ser. No. 521,400
Int. Cl. C08f *1/88, 1/42*
U.S. Cl. 260—93.7                                 4 Claims

ABSTRACT OF THE DISCLOSURE

Olefin polymers prepared with a catalyst comprising an alkylaluminum compound and a reduced titanium halide are worked up by quenching the polymerization slurry with an alcohol, treating the quenched slurry with a small amount of sulfuric or phosphoric acid, and thereafter extracting with an aqueous alkaline reagent. The sulfuric or phosphoric acid treatment is effective in reducing the corrosivity of the polymer to metals in subsequent processing operations.

---

The present invention relates to a process for the purification of stereoregular polyolefins prepared by a low-pressure process in a liquid diluent.

There are known processes for polymerizing ethylene and other 1-olefins under relatively mild conditions of temperature and pressure by using as a catalyst for the polymerization a reduced titanium halide in the presence of an organoaluminum compound as an activator. The polymerization is usually carried out by adding the catalyst and activator to an inert organic diluent, preferably a hydrocarbon having no ethylenic unsaturation, which is liquid under the reaction conditions, and passing the ethylene or other olefin into the catalyst diluent mixture at atmospheric or slightly elevated pressure and at room temperature or slightly above. When an olefin is so polymerized, a highly crystalline polymer is obtained which has many industrial uses. In the course of the polymerization, the polymer, which is insoluble in the reaction medium, precipitates out and can be separated from the diluent by any of the usual means such as filtration, centrifugation, etc.

Reduced titanium halides are those in which the titanium exhibits a valence less than four. The preferred reduced titanium compound is titanium trichloride, a term which is used rather loosely to refer to pure $TiCl_3$ as well as to other compositions where $TiCl_3$ is cocrystallized with various aluminum compounds. For example, a material sold commercially as titanium trichloride and employed as an olefin polymerization catalyst is actually a cocrystal of titanium and aluminum chlorides having the empirical formula $AlTi_3Cl_{12}$. Other compounds referred to as titanium trichloride can be prepared by reducing $TiCl_4$ with hydrogen, metallic titanium or titanium monoxide. Another popular method of preparing titanium trichloride comprises reducing $TiCl_4$ with an organoaluminum compound such as a trialkylaluminum or an alkylaluminum halide. Here again, the product of the reaction is not simple $TiCl_3$, but titanium trichloride cocrystallized with other materials such as $AlCl_3$ or with $AlCl_3$ and an organoaluminum halide.

The organoaluminum compound which is used as an activator is a compound having at least one hydrocarbon radical linked to aluminum. Exemplary of such compounds are trialkylaluminums such as triethyl, tripropyl, and trioctylaluminum, inter alia; dialkylaluminum halides such as dimethylaluminum chloride, dibutylaluminum bromide, dioctylaluminum bromide, inter alia; and alkylaluminum dihalides such as ethylaluminum dichloride, propylalminum dibromide and butylaluminum dichloride. When using the alkylaluminum dihalides as activators, the presence of a third component such as an ether, an amine, or a dialkoxy-substituted silica is often desirable.

As stated, catalyst systems based on the reduced titanium halides and organoaluminum compounds are the most efficient catalysts yet developed for the preparation of crystalline olefin polymers having a high degree of stereoregularity. However, large quantities of the catalyst and activator normally remain in the polymer after it is separated from the reaction diluent; and these residues adversely affect the color, stability, and electrical properties of the polymer and also render it corrosive to metal. Hence, it has been necessary to devise methods for purifying such polymers to rid them of these catalyst residues which are inherently present at the completion of the polymerization process.

One process which has been suggested, and which is in common usage, comprises treating the polyolefin, while still slurried in the polymerization diluent, with a small amount of a low molecular weight alkanol such as methyl, ethyl, propyl, isopropyl, butyl alcohol, or the like, to solubilize the catalyst residues. The alkanol-containing slurry is then washed with an aqueous liquid to extract the catalyst residues from the slurry. The diluent phase, containing the polymer, and the aqueous phase, containing the catalyst residues, are then separated; and the polymer is recovered from the diluent phase.

In U.S. Patent 2,974,132 to Jacobi et al., a variation of this latter technique is disclosed wherein the polymerization slurry, prior to the alkanol treatment, is contacted with about 1.1 to 1.5 moles of an olefin oxide for each reactive group present in the catalyst. The thus treated polymer slurry can then be further treated according to the process just described.

Yet another purification technique is taught by Belgian Patent 570,084. This method comprises adding to the reaction slurry an equal amount of a mixture of 9 parts isopropyl alcohol and 1 part acetic acid, separating the solid phase, washing with water, and then drying. The patentee reports extremely low ash content in the resulting polymer. However, the method is not commercially attractive as it requires the use of relatively large quantities of both the alcohol and the acid, both of which are expensive.

These processes have proven to be efficient in reducing the total quantity of catalyst residues which remain in the polymer after the purification. However, it is known that the reaction between the alcohol and the catalyst activator is not quantitative with regard to metal-halogen bonds. It has also been observed that the polymers prepared by these methods still exhibit a high degree of corrosivity to metal, particularly during later extruding and molding operations when the polymer is maintained at a high temperature. This corrosivity is believed to result from the information of halogen acid by the rupture of these residual metal-halogen bonds at the elevated temperatures used in processing the polymers. It also appears that the corrosivity is not solely a function of the amount of catalyst residues remaining in the polymer, as it is also a function of the state in which it exists. Thus the corrosivity problem is particularly severe when the titanium trichloride has been prepared by the addition of an alkylaluminum halide to $TiCl_4$.

It is the object of this invention to provide a process for deactivating catalyst residues in polyolefins prepared with reduced titanium halide-organoaluminum compound catalysts whereby a polymer is prepared having greatly reduced corrosivity to metal. Briefly stated, the improved process comprises polymerizinz an α-olefin with a reduced titanium halide-organoaluminum compound catalyst in an inert organic diluent to form a slurry of polymer in diluent, quenching the polymerization with about 1 to 5% of an aliphatic alcohol, based upon the volume of slurry, and treating the quenched slurry, prior to water washing, with a small amount of sulfuric or phosphoric acid. Thereafter, the purification process is continued in the known manner by washing, or extracting, with an aqueous liquid, separating the liquid and polymer phases, and recovering the polymer. The acid is employed at a level of about 0.5 to 2 equivalent of acid per equivalent of halogen-containing catalyst residue, preferably about 1 equivalent of acid per equivalent of halogen in the catalyst residue.

The useful aliphatic alcohols are those which are liquid at normal temperatures, e.g., those having up to about 10 carbon atoms. For the sake of economy, it is preferred to use those of relatively low molecular weight, in particular those having 3 or 4 carbon atoms, either normal or branched chain.

In the practice of the invention, the polymerization is conducted by suspending the catalyst mixture in an inert reaction medium, at a temperature of about 20 to 150° C. The inert reaction medium is preferably a saturated hydrocarbon or mixture of saturated hydrocarbons, boiling in the range of 35 to 200° C. The olefin to be polymerized, in the gaseous state, is passed into the reaction medium until the reaction vessel is presurrized to the desired operating pressure. As the reaction proceeds, additional olefin gas is added to maintain the previously selected operating pressure. Reaction is continued until the quantity of precipitated polymer in the reaction medium is sufficient to impede efficient agitation. At this point, excess olefin gas is vented off and the polymerization reaction is arrested or quenched by adding the alkanol to deactivate the catalyst. The alcohol-treated slurry is then agitated at about 75° C. for a sufficient time to assure complete quenching of the reaction.

Following the alcohol quench, the slurry is treated by addition of an amount of phosphoric or sulfuric acid between 0.5 and 1.5 equivalent per equivalent of chloride residues in the catalyst. This treatment is continued for at least about one hour, with vigorous agitation, at a temperature of about 75° C. The reaction between the acid, alcohol, and catalyst is evidenced by the emission of hydrogen chloride gas and the formation of a heavy alcohol and hydrocarbon-insoluble, blue or purple colored precipitate.

After allowing sufficient time for the acid to react with the catalyst components, the slurry is treated with an aqueous alkaline reagent at about 60° C. The precipitate of the catalyst reaction products is readily soluble in the alkaline medium and passes into the water phase readily.

Since the water and the hydrocarbon are immiscible, they readily separate into two layers, with the complexed catalyst residues dissolved in the water phase and the polymer remaining in the hydrocarbon phase. Separation is then easily effected, as, e.g., by decanting the water layer. The polymer can then be filtered out of the organic phase, washed again with water to remove any residual, previously undissolved, catalyst residues, steam distilled to remove traces of hydrocarbon reaction medium, and dried.

In addition to being less corrosive to metal than other polymers prepared by similar procedures without the anhydrous acid treatment, the polymers prepared according to this procedure usually exhibit a lower total quantity of catalyst residues, as evidenced by lower ash content. Since, as pointed out previously, corrosivity is not necessarily a function of the amount of catalyst residues present, this decreased ash content actually represents an additional benefit derived from the instant invention. However, the corrosivity reduction accomplished by the process is the primary means of evaluating its efficacy. Corrosivity is determined as follows: 1.65 grams of unstabilized polymer powder is spread in a uniform layer in a 2 x 2 x 0.62-inch mold cavity. A carefully cleaned sheet steel specimen measuring 1.375 x 1.375 x .010 inches is placed upon this layer and covered with another uniform layer of 1.65 grams of polymer. The mass is compressed for one hour at 250° C. After cooling, the polymer is stripped from the steel specimen and the specimen weighed, then suspended for one hour in boiling water vapor, dried and weighed again. The corrosivity is expressed as percentage weight gain of a steel specimen treated in this manner. To be commercially acceptable, a polymer should cause no more than about 0.05% weight gain in this test.

In the examples which follow, parts and percentages are by weight unless otherwise specified.

Examples 1–10

A polymerization catalyst was prepared by adding over a period of 160 minutes, 160 parts of a 1.5 M solution of aluminum sesquichloride in n-heptane to a reaction vessel containing 66 parts n-heptane and 22 parts $TiCl_4$. The reaction product was aged overnight at about 0 to 3° C., then heated for 4 hours at temperatures between 85 and 125° C. The product turned from brown to purple during this step. After cooling, the solid reaction product was isolated by centrifugation, mother liquid was discarded, the solid was washed with n-heptane and then stored in n-heptane until ready for use.

Polymerizations were conducted by charging into a pressure vessel containing 750 parts hydrocarbon diluent about 14 mmoles of $AlEt_2Cl$ and 7 mmoles of the reduced Ti compound prepared as above. After sufficient stirring to insure homogeneity of the mixture, the vessel was evacuated and propylene added to a pressure of 28 p.s.i.g. Polymerization was continued for about 6 hours at 28 p.s.i.g., when the propylene was shut off, and the reaction quenched by addition of an alcohol in the amount specified.

The alcohol quench was continued for at least half an hour. Following this, the acid was added in the specified amount. The sulfuric acid was added as a solution in isopropanol of about 98% $H_2SO_4$. The phosphoric acid was a solution in isopropanol of 85% $H_3PO_4$.

The acid-treated slurry was agitated gently for about one hour, then aded to 400 parts of a solution of 1% sodium gluconate and 1% sodium hydroxide in water. The mass was agitated vigorously to assure good contact between phases, which were separated by decantation. The polymer was then separated from the diluent, steam distilled to remove all remnants of diluent, washed several times with clear water and dried.

Analyses for catalyst residues and for corrosivity are recorded in the following table:

TABLE

| Ex. No. | Alcohol | Conc. (Percent by Vol.) | Acid | Eq./Cl | Ti | Al | Cl | Corrosivity, percent gain | Color of precipitate |
|---|---|---|---|---|---|---|---|---|---|
| Control 1 | n-Propyl | 2 | | | 48 | 26 | 24 | 0.079 | |
| Control 2 | Isopropyl | 2 | | | 99 | 34 | 40 | 0.151 | |
| 1 | do | 2 | $H_2SO_4$ (28% in IPA) | 1.0 | 34 | 43 | 55 | 0.038 | Blue. |
| 2 | do | | $H_3PO_4$ (20% in IPA) | 1.0 | 19 | 16 | 41 | 0.004 | Do. |
| 3 | do | | do | 1.6 | 22 | <5 | 11 | 0.016 | Do. |
| 4 | do | | $H_2SO_4$ (Conc. 98%) | 1.6 | 25 | 68 | 9 | 0.033 | Blue, gummy. |
| 5 | do | 0.8 | $H_2SO_4$ (50% in IPA) | 1.0 | 66 | 75 | <5 | 0.040 | Do. |
| 6 | do | 1.3 | do | 1.6 | 57 | 28 | 7 | 0.037 | Do. |
| 7 | do | 0.8 | $H_3PO_4$ (39% in IPA) | 1.6 | 40 | 27 | 9 | 0.036 | Do. |
| 8 | do | 1.3 | do | 1.6 | 26 | 22 | 6 | 0.050 | Do. |
| 9 | Isobutyl | 2 | do | 1.0 | 42 | 19 | 28 | 0.012 | Do. |
| 10 | n-Propyl | 2 | do | 1.0 | 30 | 5 | 9 | 0.008 | Do. |

It has been found that best results are achieved by carrying out the steps in the order described; i.e., alcohol quench followed by acid treatment. If the acid is added prior to the alcohol or simultaneously therewith, poor results are realized. This may be due to the fact that the effect of the acid is exerted upon the products of the reaction between the isopropanol and the catalyst. If the acid is present before this reaction is complete, the alcohol-catalyst reaction and the alcohol-acid reaction compete, thus reducing the efficiency of the former.

It is also desirable that the acid be employed in a relatively concentrated state. Thus, in the case of sulfuric acid, the concentration should be about 98% or higher. In the case of phosphoric acid, the concentration should be about 85% or higher.

What I claim and desire to protect by Letters Patent is:

1. In the process for preparing a crystalline polymer by polymerizing an α-olefin in the presence of an alkyl-aluminum compound and a reduced titanium halide in an inert diluent to form a slurry, quenching the polymerization slurry with an alkanol, and thereafter extracting with an aqueous alkaline reagent, the improvement which comprises treating the alkanol-quenched slurry with a substantially anhydrous mineral acid selected from the class consisting of phosphoric and sulfuric acids, the quantity of said acid being about 0.5 to 2 equivalent per equivalent of halogen residue calculated to be present in the slurry.

2. A process of claim 1 where the α-olefin is propylene.

3. The process of claim 2 where the acid is sulfuric acid.

4. The process of claim 2 where the acid is phosphoric acid.

References Cited

UNITED STATES PATENTS 3,338,878    8/1967    Kutner.

JOSEPH L. SCHOFER, *Primary Examiner.*

L. EDELMAN, *Assistant Examiner.*

U.S. Cl. X.R.

260—94.9